Jan. 2, 1962  E. P. O'DONNELL  3,015,181
FISHHOOK SETTING DEVICE
Filed Nov. 25, 1959
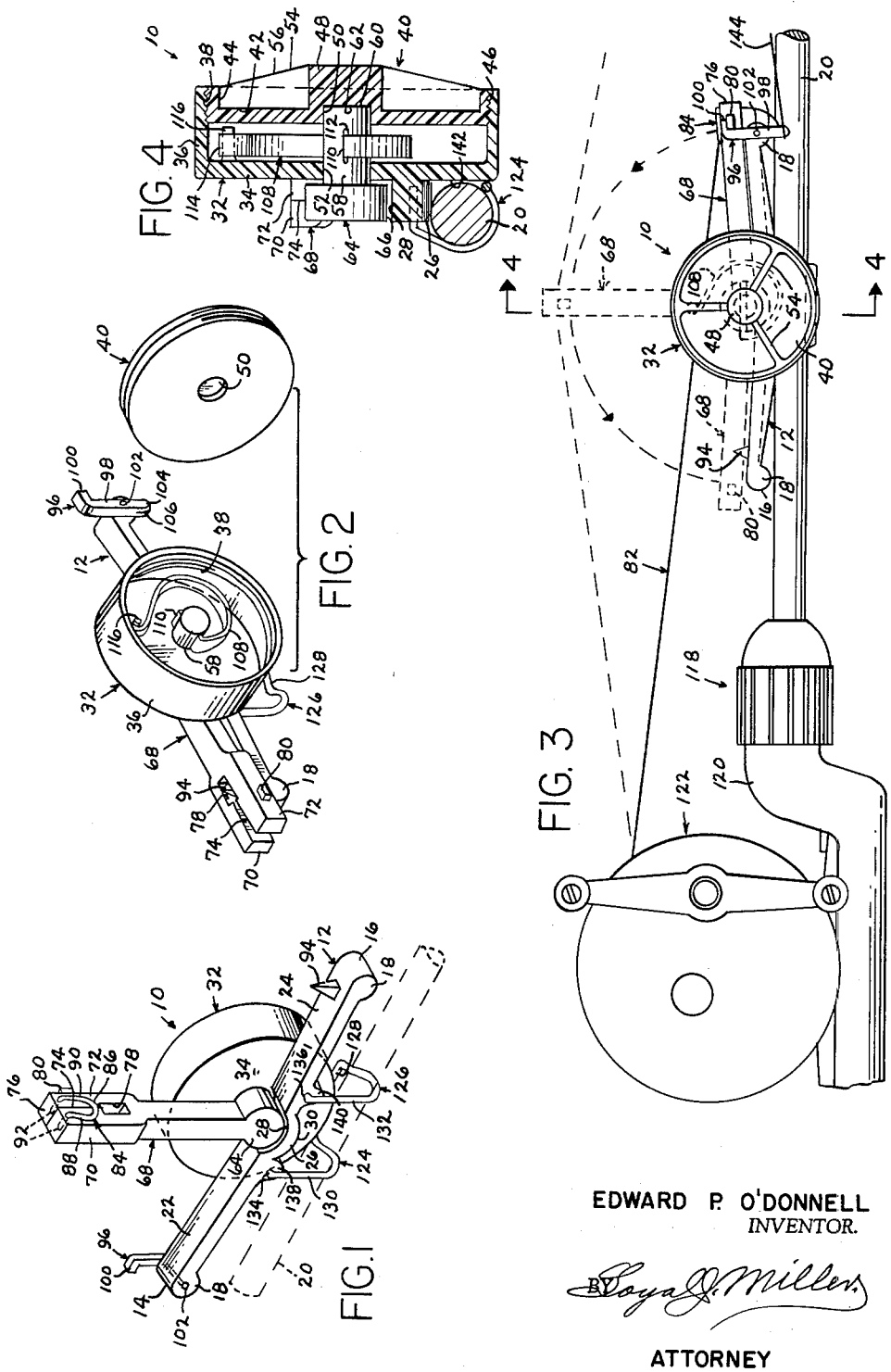
EDWARD P. O'DONNELL
INVENTOR.
ATTORNEY

United States Patent Office 3,015,181
Patented Jan. 2, 1962

3,015,181
FISHHOOK SETTING DEVICE
Edward P. O'Donnell, Shawnee, Okla., assignor to
Ralph C. Rich, Shawnee, Okla.
Filed Nov. 25, 1959, Ser. No. 855,444
3 Claims. (Cl. 43—15)

The present invention relates to fishing and more particularly to a novel spring-operated fishhook setting device for attachment to fishing rods.

The principal object of the instant invention is to provide a more efficient, effective, and reliable device of this kind, which is of unusually small size and compactness, and which can be formed entirely, except for its spring components, of such corrosion-and-rust-resistant materials, as plastic or lightweight metals.

Another object of the invention is to provide a device of the character indicated above which is of relatively short overall length, so that it occupies a minimum length portion of a fishing rod, when attached thereon, the device being readily attachable to and removable from rods of different diameters.

A further object of the invention is to provide a device of this character which is relatively simple in construction, is composed of a small number of easily assembled parts, and which can be made in rugged, serviceable and well-finished forms, at relatively low cost.

The present invention accomplishes these and other objects by providing an elongated base bar adapted to be connected in longitudinal alignment to the upper surface of a fishing rod. A cylindrical housing is secured to one side of the base bar medially the ends of the latter. A radial arm is journaled at one end by the housing for vertical pivoting movement between the respective end portions of the base bar. The free end of the arm is bifurcated and slotted for resiliently gripping a fishing line. Trigger means, connected with the forward end portion of the base bar, maintains the arm in a forwardly disposed cocked position. Spring means, carried by the housing and connected with the pivotally connected end of the arm, urges the arm toward a rearward position when the trigger is released by a pull on the fishing line engaged with the latter. A cam, fixed to the end of the base bar opposite the trigger equipped end, enters the slot in the free end of the arm when the arm is spring urged rearwardly for spreading the ends of the latter and releasing the fishing line.

Other objects will be apparent from the following description when taken in conjunction with the accompanying single sheet of drawings, wherein:

FIGURE 1 is a perspective view of the device, showing the same attached to a fishing rod, shown in dotted lines, and showing the fishhook setting arm in partially rotated position;

FIGURE 2 is an exploded perspective view of the device, showing the spring housing cover removed from the housing;

FIGURE 3 is a fragmentary side elevational view, showing the device attached to a fishing rod, in association with a fishing line, with the fishhook setting arm shown in set and trigger-held position in solid lines, and in fully operated position in dotted lines; and, FIGURE 4 is a vertical transverse section taken substantially along the line 4—4 of FIG. 3.

Like characters of reference designate like parts in those figures of the drawings in which they occur.

In the drawings:

Referring in detail to the drawings, the device, generally designated 10, comprises a preferably solid, horizontally elongated base bar 12, preferably rectangular in cross section, and having at its forward and rear ends 14 and 16, respectively, depending partly cylindrical fishing rod engageable bumpers 18. The base bar 12 need not be wider than the diameter of a fishing rod shaft 20, upon which the device 10 is mounted, and can be narrower.

The base bar 12 has an upper surface which is composed of forward and rearward portions 22 and 24 of similar length, which are disposed at wide upward longitudinal angles relative to each other, and extend to the ends of the bare bar. The inward ends of the upper surface portions 22 and 24 terminate at and meet the ends of a central arcuately curved or bowed downwardly longitudinal base bar portion 26. The bowed portion 26 has a concave upper surface 28, and a convex undersurface 30, whereby the latter may bear upon the upper side surface of a fishing rod shaft 20, as seen in FIG. 4, and can then act as a supporting fulcrum, allowing the base bar 12 to rock forwardly and rearwardly upon the shaft 20, the rocking being limited and stopped by engagement of the bumpers 18 with the rod shaft 20, the bumpers 18 being otherwise spaced above and out of engagement with the shaft 20, as seen in FIG. 3.

Fixed or formed integrally on a side of the base bar 12, at the middle thereof, as on the right-hand side thereof, as shown in FIGS. 2 and 4, is a relatively large diameter horizontal axis cylindrical cup-shaped spring housing 32, which comprises a vertical bottom wall 34 secured to the side of the base bar 12, a circular peripheral side wall 36, extending laterally outwardly from the bottom wall 34, and provided at its outward end, with internal screw threads 38, which terminate at a point spaced from the bottom wall 34, as seen in FIG. 4.

A combination housing cover and journal bearing 40, comprises a circular pan-shaped body composed of a web 42 having on its peripheral edge a laterally outwardly extending side wall 44 and is externally screw threaded, as indicated at 46, so that the combination 40 can be threaded into the housing 32 to close and seal the same, with the web 42 spaced from the housing bottom wall 34. At its center, the web 42 is thickened in cross section to provide thereat an external axial boss 48, and the web 42 and the boss 48 are bored to define a journal socket 50 opening to the inward side of the web 42. The socket 50 is axially aligned with a bearing opening 52, which extends centrally through the housing bottom wall 34, and is preferably of the same diameter as the socket. The combination 40 has external hand-hold radial ribs 54, preferably three in number and equally spaced circumferentially therearound. The ribs 54 reach between and are secured to or are integral with the web 42, the side wall 44, and the boss 48, and have outer edges 56 which are angled inwardly from the outer end of the boss to the free edge of the side wall 44. The ribs 54 provide for easy and accurate manual rotation of the combination, into and out of the housing 32.

Journaled through the housing bottom wall bearing opening 52, across the interior of the housing 32, and in the socket 50, is a cylindrical stub-shaft 58, having an end 60 engaging the bottom 62 of the socket. Fixed or integrally formed on the other end of the stub-shaft 58, and bearing against the exterior surface of the housing bottom wall 34, is an enlarged diameter, preferably cylindrical head 64, having a peripheral edge 66 whose lower part is concentrically positioned in the upper concavity 28 of the central bowed portion 26 of the base bar 12. As seen in the drawings, the housing 32 is substantially larger in diameter than the thickness of the base bar 12, and extends thereabove and therebelow, the lower part of the housing 32 being thereby disposed below the base bar 12 and along a side of a fishing rod shaft 20, on which the device is mounted, as shown in FIG. 4.

Fixed on or formed integral at its inward end to the head 64 is a radial hook-setting arm 68, which is preferably less than half the length of the base bar 12, and is preferably of rectangular cross section and of the same thickness as the head 64. The outer end portion of the arm 68 is widened to provide a pair of opposed, similar clamping jaws 70 and 72, which are disposed lengthwise of the arm 68 and reach laterally beyond opposite sides of the arm 68, as seen in FIG. 1. The jaws are separated by a longitudinal transverse slit 74, which opens at its outward end through the outward end 76 of the arm 68 and at its inward end opens into a substantially wider rectangular bore 78, which opens to the top and bottom of the arm 68. On the laterally outward side of the jaw 72 is a trigger lug or detent 80.

The jaws 70, 72 are somewhat flexible, so as to be capable of being spread by means hereinafter described and by the pulling of a fishing line 82 through the slit 74, and to limit the flexibility and to tension the jaws toward each other, for greater frictional resistance to drawing of a fishing line through the slit 74, and to close the jaws against being spread, jaw-closing spring means is provided, which is preferably in the form of a U-shaped metal springs 84.

The spring 84 is preferably located on the rearward, and sometimes upward sides of the jaws 70, 72, and has a bight portion 86 which bridges the slit 74, and arms 88 and 90, which bear against the tops of the jaws 70 and 72, respectively, and which have laterally directed terminals 92 which are embedded in the jaws.

On the upper side of the rear upper surface portion 24 of the base bar 12, near the rear end 16 of the base bar, is a fixed upstanding pyramidical jaw spreading cam 94, which is located to enter the bore 78 in the fishhook setting arm 68 for spreading the jaws 70, 72, for freeing from between the jaws the fishing line 82 engaged therebetween, as the arm 68 is swung rearwardly from a trigger-held forward position, as indicated in FIGS. 1 and 3.

The arm 68 is held releasable, in its forward position, in which it is close to or rests upon the forward upper surface portion 22 of the base bar 12, by trigger means, which is an inverted L-shaped trigger 96 composed of a straight elongated bar 98 which terminates at its upper end in a lateral, forwardly directed leg 100. The elongated bar 98 is pivoted at a point intermediate its ends, as indicated at 102, on the outward side of the base bar 12, at the forward end thereof, and preferably concentric with respect to the forward bumper 18, as seen in FIG. 3. In the erect, forwardly tilted or rotated position of the trigger 96, the leg 100 engages retainably over the detent lug 80, so as to hold the arm 68 down in its forwardly swung set position. As seen in FIG. 2, the lower end 104 of the trigger bar 98 is formed with a vertical slot or notch 106 to receive the fishing line 82.

For spring-pressing or rotating the arm 68 from its forward position to its rearward position, spring means is provided in the housing 32, which is preferably in the form of a flat spiral or clock spring 108, which as circumposed around the shaft 58 and has an inner end 110 securably engaged in a diametrical slot 112 provided on the shaft 58, and an outer end which has a loop 114 which is securably engaged on an anchor pin 116 which projects from the upper part of the housing bottom wall 34, as seen in FIGS. 2, 3 and 4, the spring 108 being spiralled clockwise, in FIG. 3, around the shaft 58. In this arrangement of the spring 108 the same is tightened around the shaft 58 and tensioned, when the arm 68 is swung forwardly along the base bar 12, from its rearward position to its forward position thereon, so that when the trigger 96 is released from the detent lug 80, the spring 108 acts to forcibly swing the arm 68 toward its rearward position, for setting a fishhook (not shown) in the mouth of a fish taking the hook on the fishing line 82.

For removably mounting the device 10 on the shaft 20 of a fishing rod 118, at a point near to and forwardly of the rod handle 120 and a reel 122 mounted thereon, and on which the line 82 is wound, spring clamp means is provided on the base bar 12, which preferably comprises a pair of longitudinally spaced, laterally outwardly extending hook-shaped jaws 124 and 126, having fixed to and extending between their free ends a longitudinal connecting bar 128. The jaws 124 and 126 have vertical upwardly projecting shanks 130, 132, respectively, which have on their upper ends laterally outwardly extending terminals 134, 136, which are embedded in the laterally outward ends of preferably half-cylindrical lugs 138, 140, which are fixed to the underside of the base bar 12, at points near to related ends of the central bowed portion 26, as seen in FIG. 1, and which bear rockably on the rod shaft 20.

As shown in FIGS. 3 and 4, the device 10 is attached to the fishing rod shaft 20 by flexing the jaws 124, 126 downwardly and laterally inwardly, so as to admit the shaft 20 to be clamped by the jaws, between the jaws and the convex underside 30 of the bowed central portion 26 of the base bar 12, and the laterally inward side 142 of the housing bottom wall, as shown in FIG. 4. It is to be noted that the resilience of the clamping spring, operating in conjunction with the fulcrum bearing of the bowed base bar portion 26 and lugs 138, 140 on the shaft 20, and the spacing of one or both of the bumpers 18 from the shaft 20, endows the device 10 with a shock absorbing mounting on the shaft 20, which serves to reduce to a minimum the otherwise objectionable shock which is produced by the striking of the spreader cam 94 by the setting arm 68, as the fishhook setting arm is spring-operated to its rearward position, upon release of the trigger 96.

In stringing and setting the device 10, the fishing line 82 is brought forward from the reel 122, passed through the slit 74 so as to be frictionally held by and between the setting arm jaws 70, 72, then brought down to the lower end of the trigger bar 98 and engaged forwardly through its notch 106. The part 144 of the fishing line 82 forwardly of the device 10, having a fishhook (not shown) thereon, is dropped into the water and the fishing rod held and manipulated for fishing in the usual way.

When a fish takes and holds the fishhook and exerts pull on the forward line part 144, the trigger 96 is tilted rearwardly off the detent lug 80, and the arm 68 is rotated rearwardly by the spring 108, so that the line part 144 is jerked, so as to set the hook in the caught fish.

As the arm 68 reaches its rearward position, the spreading cam 96 engages in the bore 78 and spreads the jaws 70, 72 away from each other, so that the line 82 is freed from between the jaws and from the device 10, so that the caught fish can be played with complete freedom from and without regard to the presence of the device 10 on the fishing rod.

Obviously the invention is susceptible to some change or alteration without defeating its practicability, and I therefore do not wish to be confined to the preferred embodiment shown in the drawings and described herein, further than I am limited by the scope of the appended claims.

I claim:

1. A fishhook setting device for a fishing rod shaft, comprising: a longitudinally elongated base bar having forward and rearward ends; a vertical cup-shaped housing fixed to one side of the base bar at the middle thereof, said housing having a bottom wall and a side wall defining an open side of the housing; a combination cover and bearing removably engaged in the open side of the housing; said combination cover and bearing comprising a vertical web spaced from the housing bottom wall and an axial boss having a bearing socket; a stub-shaft having an outer end engaged in the socket of said boss, said bottom wall having an axial journal opening through which said shaft extends; an enlarged head on the end of said shaft remote from its end within the socket, said enlarged head bearing against the exposed side of the housing bottom wall; a radial fishhook setting arm fixed at one end to said enlarged head and having a free end; resilient fishing line clamping jaws formed on the free end of said setting arm; said base bar having an upstanding clamping jaw spreading cam adjacent its rearward end for engagement between and spreading the clamping jaws apart as the setting arm is forcibly rotated from a forward cocked position along the base bar to a rearward position along the base bar, for releasing a fishing line clamped between the jaws; spring means anchored within said housing and connected to said shaft, forward rotation of said setting arm acting to tension said spring means for rotating said setting arm to its rearward position, said setting arm having a lateral trigger detent near its free end; and a trigger pivotally mounted on the base bar adjacent the forward end of the latter for retaining engagement with the trigger detent to hold said setting arm in its forward position, said trigger having an eccentric portion adapted for engagement with a fishing hook equipped part of a fishing line extending from said clamping jaws, whereby pull of a caught fish on the fishing line part pivots said trigger out of engagement with said detent to release the setting arm for rotation rearwardly by said spring means to set the hook in the fish, in advance of release of the fishing line from said clamping jaws by the engagement of said cam therebetween; fishing rod shaft engaging fulcrum means depending from the medial portion of said base bar, the free ends of said base bar having arcuate depending bumper portions normally spaced upwardly from a fishing rod shaft on which said base bar is adapted to be mounted to enable said base bar to rock endwise on the fishing rod shaft and dampen the force applied to the base bar by the rearward rotation of the setting arm; and resilient spring clamp means fixed on the medial portion of said base bar for encircling a rod shaft and attaching said device on the upper side thereof.

2. A fishhook setting device for a fishing rod shaft, comprising: a longitudinally elongated base bar having forward and rearward ends; a vertical cup-shaped housing fixed to one side of said base bar at the middle thereof, said housing having a bottom wall and a side wall defining an open side of the housing; a combination cover and bearing removably engaged in the open side of the housing, said combination cover and bearing comprising a vertical web spaced from the housing bottom wall and an axial boss having a bearing socket; a stub-shaft having an outer end engaged in the socket of said boss, said bottom wall having an axial journal opening through which said shaft extends; an enlarged head on the end of said shaft remote from its end within the socket, said enlarged head bearing against the outwardly exposed side of the housing bottom wall; a radial fishhook setting arm fixed at one end to said enlarged head and having a free end; resilient fishing line clamping jaws formed on the free end of said setting arm, said base bar having an upstanding clamping jaw spreading cam adjacent its rearward end for engagement between and spreading the clamping jaws apart as the setting arm is forcibly rotated from a forward cocked position along the base bar to a rearward position along the base bar, for releasing a fishing line clamped between the jaws; spring means anchored within said housing and connected to said shaft, forward rotation of said setting arm acting to tension the spring means for rotating said setting arm to its rearward position, said setting arm having a lateral trigger detent adjacent its free end; a trigger pivotally mounted on said base bar adjacent the forward end of the latter for retaining engagement with the trigger detent, to hold said setting arm in its forward position, said trigger having an eccentric portion adapted for engagement with a fishing hook equipped part of a fishing line extending from between said clamping jaws, whereby pull of a caught fish on the fishing line part pivots said trigger out of engagement with the detent to release said setting arm for rotation rearwardly by said spring means to set the hook in the fish, in advance of release of the fishing line from between said clamping jaws by the engagement of said cam therebetween; fishing rod shaft engaging fulcrum means depending from the middle part of said base bar, the free ends of said base bar having bumper portions on its opposing ends normally spaced upwardly from a fishing rod shaft on which said base bar is adapted to be mounted to enable said base bar to rock endwise on the fishing rod shaft and dampen the force applied to the base bar by the rearward rotation of the setting arm; and, resilient spring clamp means fixed on the middle part of said base bar adapted for encircling a fishing rod shaft and attaching said device on the upper side thereof, said spring clamp comprising a pair of longitudinally spaced resilient hooks having free ends, said hooks extending toward the housing bottom wall and having free ends adjacent to said bottom wall, said hooks being spaced below said fulcrum portion at distances that permit a fishing rod shaft to be clamped by the hooks against the fulcrum portion and said bottom wall, and a rod extending between and connected to the free ends of the hooks.

3. A fishhook setting attachment for a fishing rod shaft, comprising: a longitudinally elongated base bar having a fishing rod shaft engaging fulcrum means medially its ends and having forward and rearward end portions inclined upwardly from said fulcrum means; a vertical cup-shaped housing fixed to one side of said base bar at the middle thereof, said housing having a bottom wall and a side wall defining an open side of the housing; a combination cover and bearing removably engaged in the open side of the housing, said combination cover and bearing comprising a vertical web spaced from the housing bottom wall and an axial boss having a bearing socket; a stub-shaft having an outer end journaled in the socket of said boss, said bottom wall having an axial journal opening through which said shaft extends; an enlarged head on the end of said shaft remote from its end journaled by the socket, said enlarged head bearing against the outwardly exposed side of the housing bottom wall; a radial fishhook setting arm fixed at one end to said enlarged head and having a free end; resilient fishing line clamping jaws formed on the free end of said setting arm, said base bar having an upstanding clamping jaw spread cam adjacent its rearward end positioned for engagement between and spreading the clamping jaws apart as the setting arm is forcibly rotated from a forward cocked position along the base bar to a rearward position along the base bar, for releasing a fishing line clamped between the jaws; spring means anchored within said housing and connected to said shaft, forward rotation of the setting arm acting to tension the spring means for rotating said setting arm to its rearward position, said setting arm having a lateral trigger detent near its free end; and an L-shaped trigger pivotally mounted on said base bar adjacent the forward end of the latter for retaining engagement with the trigger detent to hold said setting arm in its forward position, said trigger having a depending eccentric portion adapted for engagement with a fishing hook equipped part of a fishing line extending from said clamping jaws whereby pull of a caught fish on the fishing line part pivots said trigger out of engagement with the detent to release said setting arm for rotation rearwardly by said spring means to set the hook in the fish, in advance of release of the fishing line from between the clamping jaws by engagement of said cam therebetween, said jaws having facing and engaged sides defining a slot between the jaws, said setting arm having a rectangular bore extending vertically therethrough adjacent the inward end of the slit and into which the slit opens, the rectangular bore being wider than the slit, said clamping jaw spreading cam being pyramidical and dimensioned to engage the opposing sides of said setting arm defining the rectangular bore and spread the clamping jaws laterally away from each other.

References Cited in the file of this patent
UNITED STATES PATENTS

| | | |
|---|---|---|
| 2,707,842 | Humphreys et al. | May 10, 1955 |
| 2,877,591 | Stabryla | Mar. 17, 1959 |
| 2,887,812 | Staskiews et al. | May 26, 1959 |